Sept. 10, 1929.         A. M. MALLUK         1,727,476
CLOSURE FOR FUEL TANKS
Filed Nov. 30, 1926         2 Sheets-Sheet 1
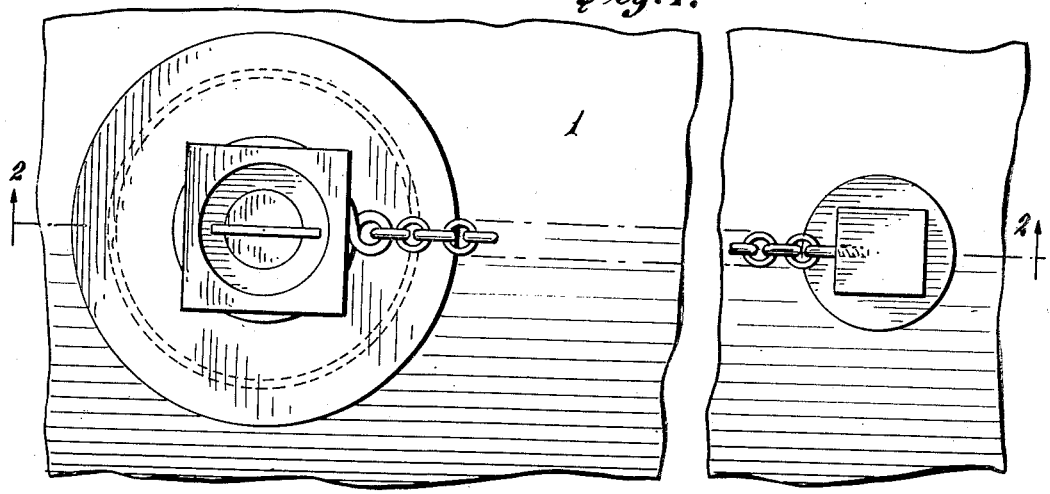
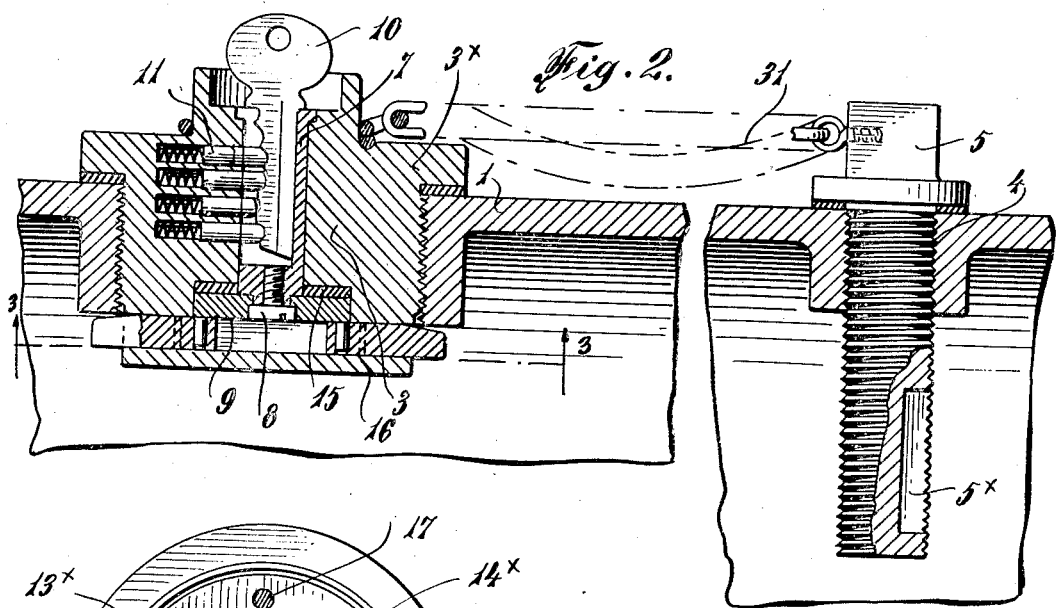
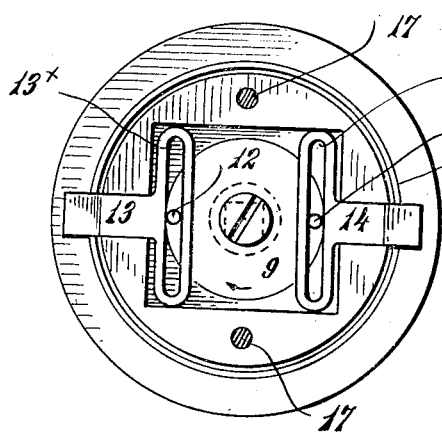
INVENTOR
Assad M. Malluk
BY
ATTORNEY Sept. 10, 1929.    A. M. MALLUK    1,727,476
CLOSURE FOR FUEL TANKS
Filed Nov. 30, 1926    2 Sheets-Sheet 2

INVENTOR
Assad M. Malluk
BY
ATTORNEY

Patented Sept. 10, 1929.

1,727,476

UNITED STATES PATENT OFFICE.

ASSAD M. MALLUK, OF NEW YORK, N. Y.

CLOSURE FOR FUEL TANKS.

Application filed November 30, 1926. Serial No. 151,812.

The object of the present invention is to provide a closure particularly adapted for fuel tanks of all kinds, such as metal barrels for the transport of oil, metal tanks for the storage of oil, including underground tanks, etc., and also tanks for other liquids such as chemicals, essential oils, etc.

The invention will be understood by reference to the accompanying drawings, in which—

Figure 1 is a plan view of an embodiment of the invention applied to a tank, and Figure 2 is a sectional elevation through the same;

Figure 3 is a bottom plan view of the locking lugs and associating mechanism;

Figure 4:
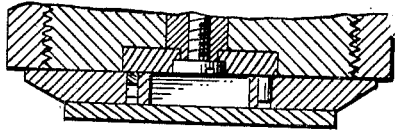
Figures 4 and 5 are respectively a sectional fragment and a bottom plan view of a modified form of device.

Referring to Figures 1 and 2 of the drawings, 1 indicates a tank for containing oil, 2 a threaded filler opening therein and 3 a filler plug. At the right of the filler plug is a second threaded opening 4 provided with a plug 5.

The filler plug 3 is preferably of metal and is provided with a lateral flange $3^x$ to contact with the upper wall of the tank. The depending threaded projection of the plug may be encircled with a yielding washer 6 so as to make the threaded connection leak-proof.

The locking parts are as follows:—

Rotatably fitted within an axial aperture formed in plug 3 is a stem 7. At its lower end the stem projects within a disk-like recess formed in the base of plug 3 and is secured by screw 8 to an actuating disk 9. Stem 7 constitutes a lock element and is formed with a key-slot to receive a key 10. Associated with stem 7 will be means adapted to lock the stem against rotation, which means will be released from the stem when the key is inserted in the slot. The specific lock mechanism forms no part of the present invention and is indicated, without detailing, in the drawings, the latter showing spring-pressed tumblers 11 adapted to be engaged by the key.

Actuating disk 9 is provided at opposite points with pins 12, $12^x$. Pin 12 enters slot $13^x$ of a locking dog 13, and pin $12^x$ enters the slot $14^x$ of a locking dog 14. Reference to Figure 3 will show that rotation of actuating disk 9 from the position therein shown will move the locking dogs toward each other until their ends come within the boundary of plug 3, enabling rotation and withdrawal of the latter from the tank.

In order to prevent leakage via stem 7, I have provided intermediate disk 9 and the upper wall of the disk-like recess formed in plug 3, a packing washer 15 which may be of any suitable resilient or elastic material and of such nature as to form an adequate seal against the passage of the oil.

The locking dogs 13, 14 may be secured to the plug body by means of a plate held by studs 17. The dogs project through openings formed in depending flange 18 (Figure 3) of the plug 3 and plate 16 abuts the said flange.

Figure 5:
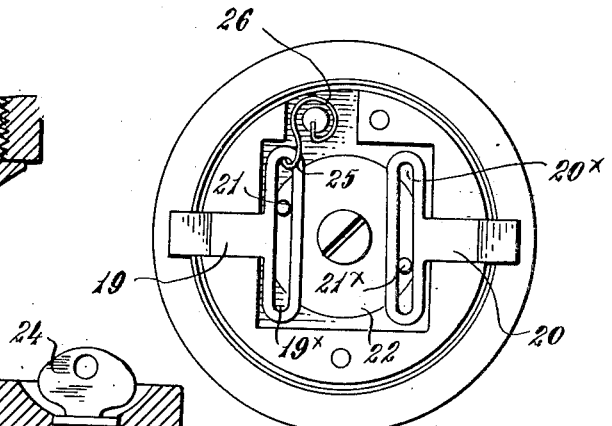
Figure 6:
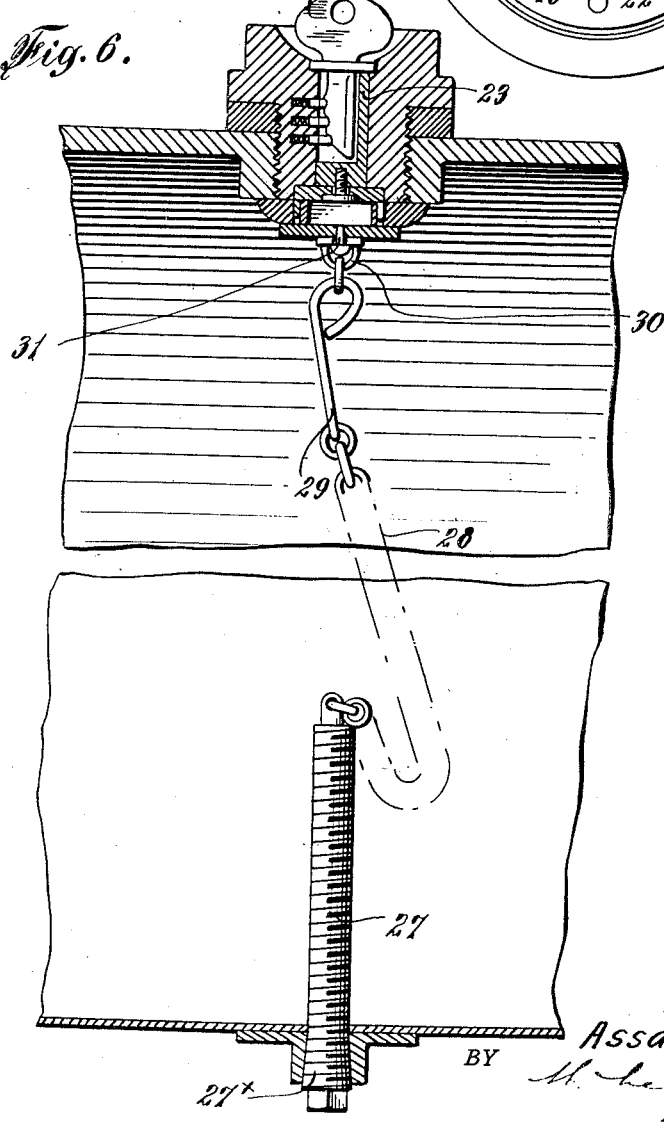
Figure 6 is a sectional elevation of a device, such as illustrated in Figures 4 and 5, having anchoring means with the drain outlet closure, the arrangement being such that the latter can be removed only through the prior removal of the filler cap, which is provided with a lock.

The modified form of device illustrated in Figures 4, 5 and 6 comprises locking dogs 19, 20, and the slot $19^x$ of dog 19 receiving an operating pin 21 on actuating member 22, and the slot $20^x$ of locking dog 20 receiving a pin $21^x$ on actuating member 22. The actuating member is carried at the lower end of a key receiving stem 23 adapted to be entered by a key 24, the stem 23 forming a locking member of such nature that the locking dogs may be manually moved toward each other against the tension of a coil spring 25, one end of which engages dog 19 and the other end of which is fixed on the plug by means of screw 26. The plug may then be inserted in the filler opening, the dogs engaging the threaded portion thereof and permitting rotation of the plug until the dogs are carried below the threaded portion of the filler opening and enable spring 25 to move dog 19 outwardly and in locking position, such movement imparting a slight rotation to actuating member 22 and thereby moving outwardly the second dog 20, the parts assuming the position illustrated in Figure 6.

When the filler cap is applied to motor fuel tanks or the like, provided with drain plugs at their base, for the removal of the sediment, I have provided means whereby the drain plug cannot be removed unless the filler plug or cap is unlocked and removed. Thus the drain plug is controlled by the key-lock of the filler plug or cap. To this end the drain plug 27 is elongated. The lower section 27ˣ thereof is made slightly conical so that when the plug is screwed upwardly to closed position, its limit of upward movement will be reached. Attached to the upper end of plug 27 is a flexible connection 28 with a hook 29, the latter being removably attached to an eye 30, swiveled about a connection 31 with the filler plug or cap. If an attempt be made to remove drain plug 27 while the filler cap is in position and locked, rotation of said drain plug 27 will move the plug downwardly until the slack is taken out of flexible connection 28. Further downward movement of plug will be prevented because it will be resisted by flexible member 28 becoming taut. Rotation of the drain plug will not twist and break the flexible connection 28 because of its swivel connection with the filler cap or plug. In order to remove the drain plug it is necessary to unlock the filler cap or plug and remove it from the tank whereupon hook 29 may be released from its swivel connection.

Where the filler opening of a tank is employed in conjunction with a plug such as 5, Figures 1 and 2, the lock for the filler cap or plug may be employed to lock the secondary plug 5. To this end I connect the two with a strong chain 31 which may be either at the outside of the tank or on the interior thereof. By such arrangement, as seen in Figures 1 and 2, rotation of plug 5 will be permitted only so long as there is slack in the chain 31. When the slack is taken up the chain will resist further rotation of the plug. Plug 5 is generally used for ventilating the interior of the tank and I have cut away a wall section at 5ˣ so that the ventilating may take place without removing the plug from the tank.

Having described my invention what I claim and desire to secure by Letters Patent is as follows:—

1. The combination of a fuel tank having a filler opening and a second opening, a closure for the filler opening, said closure having locking means whereby it may be locked to the tank, a closure for the second opening and a connection between the second opening closure and the filler opening closure whereby the latter, when locked, serves to prevent removal of the second opening closure.

2. In combination with a fuel tank having a filler opening, a closure for said opening, provided with a single longitudinal aperture, a stem afforded a bearing by the walls of said aperture and adapted to receive a key, the stem forming a lock element rotatable by said key, a packing surrounding the same, an actuating disk carried by the stem and holding the packing in position, opposed dogs each formed with a slot, pins carried by the disk and entering the slots of the dogs, a spring adapted to rotate the disk for simultaneous actuation of the dogs, and a plate carried by the closure and adapted as an actuating member for the dogs.

In testimony whereof, I have signed my name to this specification.

ASSAD M. MALLUK.